(12) United States Patent
Refsell

(10) Patent No.: US 11,839,211 B2
(45) Date of Patent: *Dec. 12, 2023

(54) CLETHODIM COMPOSITIONS AND METHODS OF USE THEREOF

(71) Applicant: Valent U.S.A., LLC, San Ramon, CA (US)

(72) Inventor: Dawn Refsell, Lathrop, MO (US)

(73) Assignee: VALENT U.S.A., LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,092

(22) Filed: Sep. 8, 2022

(65) Prior Publication Data

US 2023/0000078 A1 Jan. 5, 2023

Related U.S. Application Data

(63) Continuation of application No. 16/794,558, filed on Feb. 19, 2020, now Pat. No. 11,503,830.

(60) Provisional application No. 62/807,901, filed on Feb. 20, 2019.

(51) Int. Cl.

| | |
|---|---|
| *A01N 35/10* | (2006.01) |
| *A01N 25/02* | (2006.01) |
| *A01N 37/40* | (2006.01) |
| *A01N 37/26* | (2006.01) |
| *A01N 25/04* | (2006.01) |
| *A01N 25/30* | (2006.01) |

(52) U.S. Cl.
CPC ............. *A01N 35/10* (2013.01); *A01N 25/02* (2013.01); *A01N 25/04* (2013.01); *A01N 37/26* (2013.01); *A01N 37/40* (2013.01)

(58) Field of Classification Search
CPC ........ A01N 35/10; A01N 37/40; A01N 25/02; A01N 25/04; A01N 25/30
See application file for complete search history.

(56) References Cited

U.S. PATENT DOCUMENTS 8,809,234 B1 * 8/2014 Parrish ................... A01N 25/02
504/362

FOREIGN PATENT DOCUMENTS

| CN | 1433685 | * | 8/2003 |
| WO | WO 87/01699 | * | 3/1987 |

OTHER PUBLICATIONS

Clethodim label, Clethodim 26.4% EC, Albaugh, LLC, Jun. 2016, pp. 1-39.*
McMullan, P., "Grass herbicide efficacy as influenced by adjuvant, spray solution pH, and ultraviolet light," Weed Technology, vol. 10, pp. 72-77, (1996).*
LI 700® Product Information, 2014, retrieved from the Internet :<http://www.aeciph.com/sites/default/files/downloads/LI%20700_0.pdf>.*
Machine translation of CN 1433685 (Aug. 2003).*

* cited by examiner

*Primary Examiner* — John Pak
(74) *Attorney, Agent, or Firm* — Wood, Phillips, Katz, Clark & Mortimer

(57) ABSTRACT

The present invention is directed to clethodim compositions comprising crop oil concentrates and an acidifier. The present invention is further directed to methods of controlling weeds comprising mixing clethodim compositions comprising crop oil concentrates and an acidifier with acetochlor to create a tank mix and applying the tank mix to the weeds or an area in need of weed control.

14 Claims, No Drawings

CLETHODIM COMPOSITIONS AND METHODS OF USE THEREOF

FIELD OF THE INVENTION

The present invention is directed to clethodim compositions comprising crop oil concentrates and an acidifier. The present invention is further directed to methods of controlling weeds comprising mixing clethodim compositions comprising crop oil concentrates and an acidifier with acetochlor to create a tank mix and applying the tank mix to the weeds or an area in need of weed control.

BACKGROUND OF THE INVENTION

Clethodim (2-[1-[[[(2E)-3-chloro-2-propen-1-yl]oxy] imino]propyl]-5 [2-(ethylthio)propyl]-3-hydroxy-2-cyclohexen-1-one) is a cyclohexanedione herbicide. Clethodim is an effective post-emergence herbicide that is effective against perennial and annual grasses, however, symptoms of injury are typically slow to develop and are often not present for 7 to 10 days following treatment.

Clethodim and other dim herbicides are tank mixed with herbicides to control broadleaf plants. The herbicides to control broadleaf plants may antagonize the activity of dim herbicides on grassy weeds. It is commonly known that certain classes of broadleaf herbicides can reduce the activity of post emergence grass herbicides such as clethodim. To counteract this antagonism clethodim and other dim herbicides are used along with a crop oil concentrate. However, the addition of crop oil concentrate is not sufficient to counteract the antagonism of dim herbicides by every herbicide.

Acetochlor is a chloroacetanilide herbicide and a very long chain fatty acid inhibitor. Tank mixes of clethodim and acetochlor result in a reduction in the effectiveness of acetochlor. To combat this antagonism growers are directed to increase the concentrations of clethodim and decrease the concentrations of acetochlor. However, this method results in undesirable control of weeds.

Accordingly, there is a need for clethodim compositions that inhibit the antagonism by acetochlor and allow for tank mixing of effective concentrations of each herbicide.

SUMMARY OF THE INVENTION

In one embodiment, the present invention is directed to agricultural compositions comprising clethodim, crop oil concentrate and an acidifier.

In another embodiment, the present invention is directed to a method of controlling weeds comprising:
mixing compositions comprising clethodim, crop oil concentrate and an acidifier with acetochlor to create a tank mix; and
applying the tank mix to the weeds or an area in need of weed control.

DETAILED DESCRIPTION OF THE INVENTION

It was surprisingly discovered that the addition of an acidifier to composition containing clethodim and crop oil concentrate allowed tank mixing with acetochlor without a reduction in efficacy of clethodim. This finding was unexpected because a reduction in pH had not been previously described to inhibit antagonism between clethodim and acetochlor.

Compositions of the present invention containing clethodim, crop oil concentrate and an acidifier will provide the end user with tank mix compatibility with acetochlor. The composition will also provide effective control of grasses.

In one embodiment, the present invention is directed to agricultural compositions comprising clethodim, crop oil concentrate and an acidifier.

Crop oil concentrate may be present in compositions of the present invention at a concentration from about 0.1% to about 10% v/v, preferably from about 0.5% to about 5% v/v and more preferably from about 0.75% to about 1.5% v/v and most preferably at 1.0% v/v.

Acidifiers that may be used in compositions of the present invention include, but are not limited to, sulfuric acid; a mixture of alkyl polyoxyethylene ether, methylacetic acid and phosphatidylcholine; a mixture of carboxylic acids, phosphoric acids and ammoniated ions; and a mixture of trisodium citrate dihydrate, alkyl polyglucoside, monocarbamide, dihydrogen sulfate and tallow amine ethoxylate. In a preferred embodiment the acidifier is a mixture of alkyl polyoxyethylene ether, methylacetic acid and phosphatidylcholine.

Acidifiers may be present in compositions of the present invention at a concentration sufficient to maintain a pH of 5.3 or less for at least 2 hours.

In a preferred embodiment, compositions of the present invention have a pH of 5.3 or less, preferably 5.0 or less even more preferably 4.75 or less.

In another embodiment, compositions of the present invention may have a pH from about 3.0 to about 5.3 or from about 4.0 to about 5.0 and even more preferably from about 4.1 to about 4.75.

In another preferred embodiment, compositions of the present invention further comprise additional encapsulated pesticides, including but not limited to, dicamba.

In another embodiment, the present invention is directed to methods of controlling weeds comprising:
mixing compositions comprising clethodim, crop oil concentrate and an acidifier with acetochlor to create a tank mix; and
applying the tank mix to the weeds or an area in need of weed control.

Clethodim may be applied at a rate from about 0.1 to about 5 liters per acre, preferably from about 0.2 to about 2 liters per acre, more preferably from about 0.3 to about 1 liter per acre, even more preferably from about 0.44 to about 0.88 liters per acre and most preferably at about 0.44, 0.66 or 0.88 liters per acre.

Acetochlor may be applied at a rate from about 1 to about 10 liters per acre, preferably at a rate from about 2 to about 5 liters per acre and most preferably at a rate of 2.92 liters per acre.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied to areas where genetically modified crops ("GMOs") or non-GMO crops are growing. The term "GMO crops" as used herein refers to crops that are genetically modified.

In a preferred embodiment, the weeds controlled by the methods of the present invention include, but are not limited to, volunteer corn, fall panicum, giant foxtail and barnyard grass.

In another preferred embodiment, the area in need of weed control includes, but is not limited to, cotton fields, soybean fields and corn fields.

Throughout the application, the singular forms "a," "an," and "the" include plural reference unless the context clearly dictates otherwise.

As used herein, v/v denotes volume by total volume of the composition.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following example is offered by way of illustration only and not by way of limitation.

EXAMPLES

SelectMAX® is used as the source of clethodim and is a registered trademark of and available from Valent.

Fusilad® is used as the source of fluazifop and is a registered trademark of and available from Syngenta.

XtendiMax® is used as the source of dicamba and is a registered trademark of and available from Monsanto.

Warrant® is used as the source of acetochlor and is a registered trademark of and available from Monsanto.

Zidua® is used as the source of pyroxasulfone and is a registered trademark of and available from BASF SE.

Agridex® is used as the source of crop oil concentrate and is a registered trademark of and available from Bayer CropScience.

LI 700® is used as the source of a mixture of alkyl polyoxyethylene ether, methylacetic acid and phosphatidylcholine and is a registered trademark of and available from Loveland Products, Inc.

Spectra Max Tank Mix is used as the source of a mixture of ammonium sulfate, glycerol, phosphoric acid, polyacrylamide, and polydimethylsiloxane and is available from KALO, Inc.

FS Transform™ is used as the source of a mixture of carboxylic acids, phosphoric acids and ammoniated ions and is available from Growmark.

Jackhammer™ is used as the source of a mixture of urea, ammonium nitrate, alcohol ethoxylate and propionic acid and is available from West Central.

Intact™ contains 43.18% polyethylene glycol, choline chloride and guar gum and is available from Precision laboratories.

Example 1-Effects of an Acidifier on the Antagonism of Clethodim by Acetochlor

Method

Volunteer corn was grown in Lahas, Puerto Rico starting in December 2018 to until the corn was at V6 stage or 15 inches in height. Distinct plots of volunteer corn were then sprayed with various mixtures of clethodim, acetochlor, dicamba and LI 700® as described in Table 1, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 6 and 13 days after treatment and are represented as % control in Table 1, below. % control of volunteer corn is calculated as the number of plants killed divided by the total number of plants. Statistical significance is shown by letters wherein values sharing a letter are not statistically different.

Results

As can be seen in Table 1 below, the addition of an acidifier to mixtures of clethodim and acetochlor inhibited the antagonism of clethodim by acetochlor on volunteer corn. Specifically, a mixture of clethodim and acetochlor provided 52.5% and 91.8% control of 15-inch volunteer corn at 6 and 13 days after treatment ("DAT"). However, the addition of an acidifier increased control of 15-inch volunteer corn to 65% and 99.4% control at 6 and 13 DAT, respectively.

TABLE 1

Control of 15-inch volunteer corn

| Active Ingredients | Rate (L/HA) | % Control 6 DAT | % Control 13 DAT |
|---|---|---|---|
| Untreated | 0 | 0 | 0 |
| Clethodim | 0.44 | 85.0 | 98.8ab |
| Dicamba | 1.61 | | |
| Clethodim | 0.44 | 52.5 | 91.8b |
| Acetochlor | 2.92 | | |
| Clethodim | 0.44 | | |
| Dicamba | 1.61 | 85.0 | 98.8ab |
| Acetochlor | 2.92 | | |
| Clethodim | 0.44 | 40.0 | 92.7b |
| Acidifier* | | | |
| Clethodim | 0.44 | 65.0 | |
| Acetochlor | 2.92 | | |
| Acidifier* | | | |
| Clethodim | 0.44 | 60.0 | 99.9a |
| Dicamba | 1.61 | | |
| Acidifier* | | | |
| Clethodim | 0.44 | 60.0 | 99.9a |
| Dicamba | 1.61 | | |
| Acetochlor | 2.92 | | |
| Acidifier* | | | |

*LI 700

Example 2-Effects of an Acidifier on the
Antagonism of Clethodim by Acetochlor

Method

Volunteer corn was grown in Lahas, Puerto Rico starting in December 2018 to until the corn was at 12, 24 and 36 inches in height. Distinct plots of volunteer corn were then sprayed with various mixtures of clethodim or fluazifop, acetochlor, dicamba, pyroxasulfone and/or an acidifier as described in Table 2, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 13 days after treatment and are represented as % control in Table 2, below. % control of volunteer corn is calculated as the number of plants killed divided by the total number of plants.

Results

As can be seen in Table 2 below, the addition of an acidifier to mixtures of clethodim, dicamba and acetochlor inhibited the antagonism of clethodim by acetochlor on volunteer corn. Specifically, a mixture of clethodim, dicamba and acetochlor provided 80.0%, 88.3% and 50% control of 12, 24, and 36-inch volunteer corn, respectively. However, the addition of an acidifier increased control of 12, 24, and 36-inch volunteer corn to 96.0%, 90.0% and 86.7% control, respectively.

TABLE 2

Control of 12-inch, 24-inch and 36-inch volunteer corn

| Active Ingredients | Rate (L/HA) | % Control 12-inch | % Control 24-inch | % Control 36-inch |
| --- | --- | --- | --- | --- |
| Untreated | 0 | 0 | 0 | 0 |
| Clethodim | 0.44/0.66/0.88^ | 80.0 | 88.3 | 50.0 |
| Dicamba | 1.61 | | | |
| Acetochlor | 2.92 | | | |
| Clethodim | 0.44/0.66/0.88^ | 96.0 | 90.0 | 86.7 |
| Dicamba | 1.61 | | | |
| Acetochlor | 2.92 | | | |
| Acidifier* | | | | |
| Fluazifop | 0.37/0.37/0.44^ | 86.7 | 96.3 | 88.3 |
| Dicamba | 1.61 | | | |
| Acetochlor | 2.92 | | | |
| Acidifier* | | | | |
| Clethodim | 0.44/0.66/0.88^ | 88.3 | 91.7 | 91.7 |
| Dicamba | 1.61 | | | |
| Pyroxasulfone | 0.11 | | | |

^Rate at application to 12-inch, 24-inch and 36-inch volunteer corn, respectively
* LI 700

Example 3-Effects of Various Acidifiers on the
Antagonism of Clethodim by Acetochlor in
Volunteer Corn Method Volunteer corn was grown in Lahas, Puerto Rico starting in December 2018 to until the corn was at V6 growth stage. Distinct plots of volunteer corn were then sprayed with various mixtures of various mixtures of clethodim or fluazifop, acetochlor, dicamba, pyroxasulfone and/or an acidifier selected from LI 700®, Tank Max, sulfuric acid, FS Transform™ and Jackhammer™ as described in Table 3, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 13 days after treatment and are represented as control in Table 3, below. % control of volunteer corn is calculated as the number of plants killed divided by the total number of plants.

Results

As can be seen in Table 3 below, the addition of select acidifiers to mixtures of clethodim and acetochlor inhibited the antagonism of clethodim by acetochlor on volunteer corn. Specifically, a mixture of clethodim and acetochlor provided 88.3% control of volunteer corn. However, the addition of select acidifiers increased control of volunteer corn to from 97.7% to 99.7%. Further, acidifiers that reduced the pH from 6.0 for the positive control to less than 5.2 resulted in an increase in % control except for Jackhammer™.

TABLE 3

Control of volunteer corn with various acidifiers

| Active Ingredients | Rate (L/HA) | % Control |
| --- | --- | --- |
| Untreated | 0 | 0 |
| Clethodim | 0.44 | 88.3bc |
| Dicamba | 1.61 | |
| Acetochlor | 2.92 | |
| pH 6.0 | | |
| Clethodim | 0.44 | 88.3bc |
| Dicamba | 1.61 | |
| Acetochlor | 2.92 | |
| Acidifier (Spectra Max) | | |
| pH 5.2 | | |
| Clethodim | 0.44 | 86.7c |
| Dicamba | 1.61 | |
| Acetochlor | 2.92 | |
| Acidifier (Jackhammer ™) | | |
| pH 4.6 | | |
| Clethodim | 0.44 | 97.7a |
| Dicamba | 1.61 | |
| Acetochlor | 2.92 | |
| Acidifier (Sulfuric acid) | | |
| pH 4.1 | | |
| Clethodim | 0.44 | 99.7a |
| Dicamba | 1.61 | |
| Acetochlor | 2.92 | |
| Acidifier (LI 700 ®) | | |
| pH 4.5 | | |
| Clethodim | 0.44 | 98.0a |
| Dicamba | 1.61 | |
| Acetochlor | 2.92 | |
| Acidifier (FS Transform ™) | | |
| pH 5.03 | | |
| Fluazifop | 0.44 | 97.7a |
| Dicamba | 1.61 | |
| Acetochlor | 2.92 | |
| Acidifier (LI 700 ®) | | |
| Clethodim | 0.44 | 91.4bc |
| Dicamba | 1.61 | |
| Pyroxasulfone | 0.11 | |

Example 4-Effects of Various Acidifiers on the
Antagonism of Clethodim by Acetochlor in
Barnyard Grass Method Barnyard grass was grown in Lahas, Puerto Rico starting in December 2018 to until the grass was at tillering stage. Distinct plots of barnyard grass were then sprayed with various mixtures of various mixtures of clethodim or fluazifop, acetochlor, dicamba, pyroxasulfone and/or an acidifier selected from LI 700®, Tank Max, sulfuric acid, FS Transform™ and Jackhammer™ as described in Table 3, below. All compositions contained 1.0% v/v Agridex® crop oil concentrates. All compositions containing dicamba also contain 0.5% v/v Intact™ (43.18% polyethylene glycol, choline chloride, guar gum).

Numbers of dead plants were tallied at 13 days after treatment and are represented as control in Table 4, below. % control of barnyard grass is calculated as the number of plants killed divided by the total number of plants.

Results

As can be seen in Table 4 below, the addition of a select acidifiers to mixtures of clethodim and acetochlor inhibited the antagonism of clethodim by acetochlor on barnyard grass. Specifically, a mixture of clethodim and acetochlor provided 83.3% control of barnyard grass. However, the addition of select acidifiers increased control of barnyard grass to from 93.3% to 99%. Further, acidifiers that reduced the pH from 6.26 for the positive control to less than 5.38 resulted in an increase in % control.

TABLE 4

Control of barnyard grass with various acidifiers

| Active Ingredients | Rate (L/HA) | % Control |
|---|---|---|
| Untreated | 0 | 0 |
| Clethodim | 0.44 | 83.3c |
| Dicamba | 1.61 | |
| Acetochlor | 2.92 | |
| pH 6.26 | | |
| Clethodim | 0.44 | 80.0c |
| Dicamba | 1.61 | |
| Acetochlor | 2.92 | |
| Acidifier (Spectra Max) | | |
| pH 5.38 | | |
| Clethodim | 0.44 | 93.3ab |
| Dicamba | 1.61 | |
| Acetochlor | 2.92 | |
| Acidifier (Jackhammer ™) | | |
| pH 4.75 | | |
| Clethodim | 0.44 | 93.3ab |
| Dicamba | 1.61 | |
| Acetochlor | 2.92 | |
| Acidifier (Sulfuric acid) | | |
| pH 4.35 | | |
| Clethodim | 0.44 | 95.0bc |
| Dicamba | 1.61 | |
| Acetochlor | 2.92 | |
| Acidifier (LI 700 ®) | | |
| pH 4.65 | | |
| Clethodim | 0.44 | 99.0a |
| Dicamba | 1.61 | |
| Acetochlor | 2.92 | |

TABLE 4-continued

Control of barnyard grass with various acidifiers

| Active Ingredients | Rate (L/HA) | % Control |
|---|---|---|
| Acidifier (FS Transform ™) | | |
| pH 4.39 | | |
| Fluazifop | 0.44 | 83.3bc |
| Dicamba | 1.61 | |
| Acetochlor | 2.92 | |
| Acidifier (LI 700 ®) | | |
| Clethodim | 0.44 | 83.3bc |
| Dicamba | 1.61 | |
| Pyroxasulfone | 0.11 | |

What is claimed is:

1. An agricultural composition comprising acetochlor, clethodim, crop oil concentrate and a mixture of alkyl polyoxyethylene ether, methylacetic acid and phosphatidylcholine.

2. The composition of claim 1, wherein the composition has a pH of 5.3 or less.

3. The composition of claim 1, wherein the composition has a pH of 4.75 or less.

4. The composition of claim 1, wherein the crop oil concentrate is at a concentration from about 0.1% to about 10% v/v, wherein v/v denotes volume by total volume of the composition.

5. The composition of claim 1, further comprising dicamba.

6. A method of controlling weeds comprising applying the composition of claim 1
  b. to the weeds or an area in need of weed control.

7. The method of claim 6, wherein the composition has a pH of 5.3 or less.

8. The method of claim 6, wherein the composition has a pH of 4.75 or less.

9. The method of claim 6, wherein the composition further comprises dicamba.

10. The method of claim 6, wherein the clethodim is applied at a rate from about 0.1 to about 5 liters per hectare.

11. The method of claim 6, wherein the clethodim is applied at a rate from about 0.44 to about 0.88 liters per hectare.

12. The method of claim 6, wherein the acetochlor is applied at a rate from about 1 to about 10 liters per hectare.

13. The method of claim 6, wherein the weeds are selected from the group consisting of barnyard grass, fall panicum, giant foxtail and volunteer corn.

14. The method of claim 6, wherein the area in need of weed control is selected from the group consisting of a cotton field, a soybean field or a corn field.

* * * * *